(No Model.)
O. H. KING.
HAY PITCHER.
No. 307,205.  Patented Oct. 28, 1884.
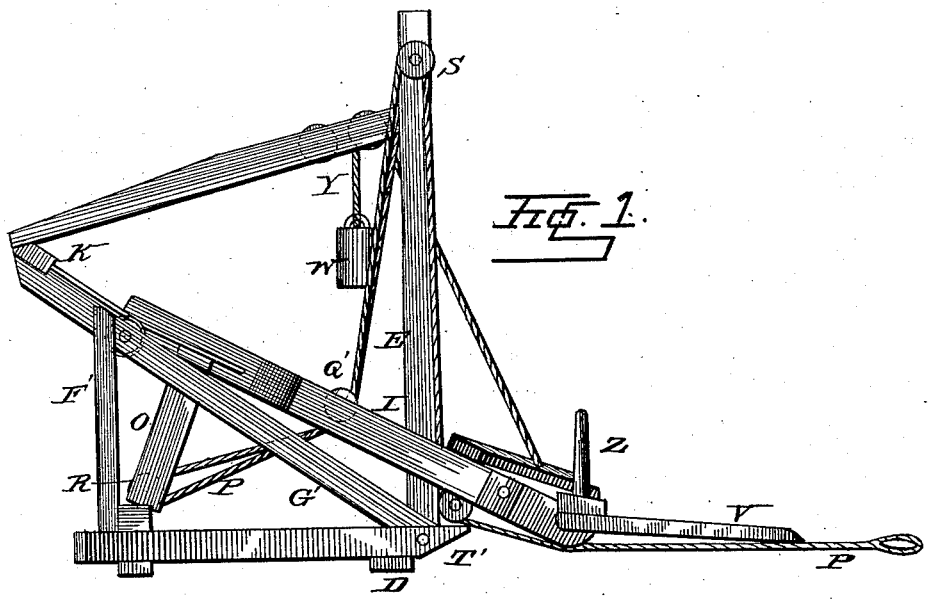
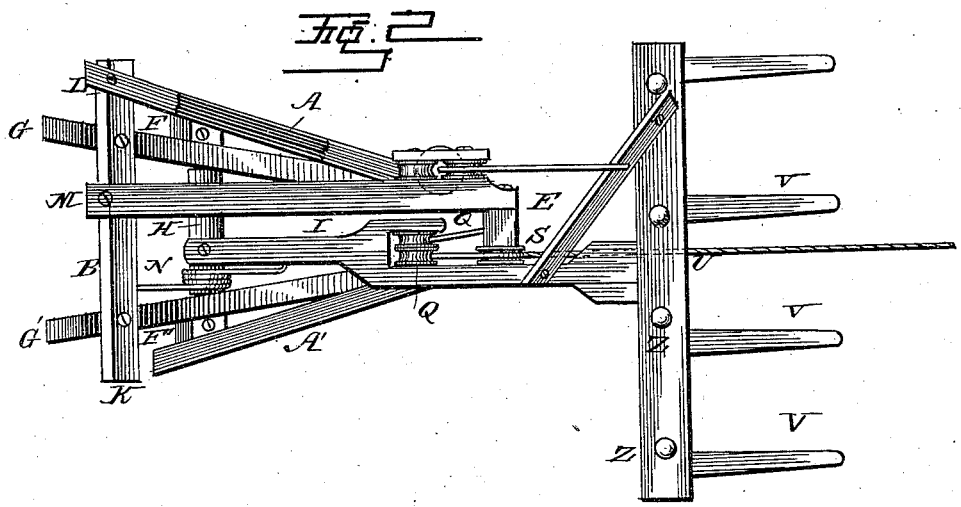
WITNESSES:
Obed H. King INVENTOR.
By Isaac T. Gibson & Co.
ATTORNEYS.

UNITED STATES PATENT OFFICE.

OBED H. KING, OF HOUGHTON, IOWA.

HAY-PITCHER.

SPECIFICATION forming part of Letters Patent No. 307,205, dated October 28, 1884.

Application filed January 5, 1884. (No model.)

*To all whom it may concern:*

Be it known that I, OBED H. KING, a citizen of the United States, residing at Houghton, in the county of Lee and State of Iowa, have invented certain new and useful Improvements in Hay-Pitchers; and I do hereby declare that the following is a full, clear, and exact description of said invention, which will enable others skilled in the art to which it belongs to make and use the same.

My invention consists in an improved construction of devices for stacking hay, all of which will be fully understood from the following description and claims.

In the accompanying drawings, Figure 1 is a side elevation of my improved hay-pitcher, and Fig. 2 is a top view of the same.

The front of my pitcher-frame is made very narrow, and the rear thereof is wide, and I prefer to make the base of the frame in the form of a triangle with three sills, as seen at A, A', and B, with the short shoe under the narrow front, as seen at D, Fig. 1. Properly secured to these sills are three posts—one in front (seen at E) and two in the rear, as shown at F F'. Two long braces, G G', extend from the sills in front upward and backward, and carry the pivoted rock-shaft H and pitcher-arm I thereon. Fastened to the upper ends of these long braces is a cross-bar, K, to which are attached two other bars or braces, L and M, both of which extend to the front post, to which they are attached. A very strong coiled spring, N, encircles the rock-shaft H, and has one end extending a considerable distance forwardly, where it is connected to the pitcher-arm I, giving to the pitcher-arm the character of an elbow-lever, and the rear end of the coiled spring is attached to the cross-bar K. The arm I is operated through a proper elbow-lever arm—seen in Fig. 1, where the pitcher-arm I has a branch arm, O, projecting laterally at right angles, and carrying a pulley, R, around which the rope P passes, thus giving the elbow-lever very great power. The upper end of the elevating-rope is attached to the front post near the top and passes down under the twin pulleys Q Q', thence around the pulley R, thence back to the twin pulleys, and up to pulley S near the top of the front post, thence down the post under the pulley T, and thence horizontally forward, to be attached to the rake, so that the team in dragging away the rake will at the same time drag the forward end of the rope, and thus, in connection with the pulleys, elevate the pitcher-arm and carry up the hay to the stack.

My pitcher-head U is provided with two sets of teeth. The front set, V, receive the hay from the rake and carry their load up to the stack. The rear set, Z, is shorter, and the load of hay, when brought up by the rake, overlaps these short teeth more or less, and is thus caught and held upon the pitcher as the rake is dragged away; but after the pitcher is elevated the load of hay easily escapes the short teeth in discharging the pitcher by the stackers. If made of metal, one set of double-pointed teeth may be used—one point in front and one in rear. The weight W and its cord Y are employed to balance the pitcher-arm, if desired; but these may be omitted, as the spring N serves the same purpose.

Having thus described my invention, what I claim is—

1. In a hay-pitcher, the described frame having a narrow front and wide rear, in combination with the rocking shaft H, pitcher-arm I, the two sets of teeth mounted on said arm, and the mechanism for operating the same, substantially as set forth.

2. In combination with the elbow pitcher-arm, the twin pulleys Q, the frame, the pulleys R, S, and T, and the rope working thereon, substantially as set forth.

3. The coiled spring N, in combination with the rock-shaft H and pitcher-arm I, substantially as specified.

In testimony that I claim the above invention I subscribe hereto, in presence of two subscribing witnesses, this 26th day of October, 1883.

OBED H. KING.

In presence of—
ISAAC T. GIBSON,
J. B. ROSE.